United States Patent [19]

Eichenwald

[11] Patent Number: 4,647,824
[45] Date of Patent: Mar. 3, 1987

[54] OUTPUT VOLTAGE CONTROL FOR A DC SERVO AMPLIFIER

[75] Inventor: Rolf Eichenwald, Setauket, N.Y.

[73] Assignee: Kollmorgen Technologies Corp., Dallas, Tex.

[21] Appl. No.: 724,834

[22] Filed: Apr. 19, 1985

[51] Int. Cl.⁴ .............................................. H02P 7/68
[52] U.S. Cl. ......................................... 318/71; 318/51; 318/67; 318/112; 318/293
[58] Field of Search ........................ 318/51, 53, 54, 55, 318/59, 67, 71, 111, 112, 113, 293, 294

[56] References Cited

U.S. PATENT DOCUMENTS

| | | | |
|---|---|---|---|
| 3,538,405 | 11/1970 | Borden et al. | 318/67 |
| 4,121,138 | 10/1978 | Flint et al. | 318/59 X |
| 4,251,757 | 2/1981 | Akamatsu | 318/51 X |
| 4,284,929 | 8/1981 | Garrett et al. | 318/51 |

FOREIGN PATENT DOCUMENTS 1905962  1/1970  Fed. Rep. of Germany ........ 318/67

Primary Examiner—William M. Shoop, Jr.
Assistant Examiner—Bentsu Ro
Attorney, Agent, or Firm—Morgan & Finnegan

[57] ABSTRACT

In a system having a plurality of electric motors which are rated at different voltages, a voltage control circuit enables the electric motors to be connected to a common power supply. The voltage control circuit determines a first voltage appearing between the positive bus of the power supply and the motor and a second voltage appearing between the negative bus and the motor. One voltage is inverted and then summed with the non-inverted voltage to provide an average voltage. The average voltage is compared to a reference voltage and when the average voltage exceeds the reference voltage, a limit signal is generated. The limit signal is used to prevent higher voltages from being applied across the motor.

5 Claims, 5 Drawing Figures

OUTPUT VOLTAGE CONTROL FOR A DC SERVO AMPLIFIER

The present invention relates generally to voltage control devices for electric motors, and more specifically, to a voltage control circuit for a servo amplifier which enables a plurality of different electric motors having different voltage ratings to be operated from a common power supply.

In the prior art, when a system utilized a plurality of different electric motors having different voltage ratings, the system required a plurality of different power supplies that were each rated to the specific needs of a particular motor and its associated servo amplifier. The inclusion of multiple power supplies rated at different values is undesirable in many applications such as robotic systems.

In robotic systems, especially those which provide multi-axes movement, there are often a plurality of servo motors which have different voltage ratings, since the motor requirements for movement along different axes is not same. If only a single power supply were included in such a system, all of the motors would have to have the same voltage rating, i.e., the same rating as the largest motor. This results in an expensive and inefficient use of some motors. The existence of multiple power supplies in such systems also increases the cost of the system. In robotic systems which are mobile, the inclusion of multiple power supplies also undesirably increases both the bulk and the weight of the robotic system. It is desirable, therefore, to minimize the cost, weight, and bulk of such systems.

Accordingly, there is a need for a voltage control circuit which can enable a plurality of different electric motors which are rated at different voltage values to be operated from the same common power supply.

SUMMARY OF THE INVENTION

The present invention provides a voltage control circuit that enables a plurality of different electric motors rated at different voltages to be operated from the same common power supply. The motors are connected between the positive and negative buses of the common power supply. In order to limit the voltage across the motor, we need to obtain a signal that is proportional to the motor voltage and to compare it to a reference voltage. This is obtained in the following manner.

The voltages at the terminals on both sides of each motor are determind. These two voltage signals are out of phase from one another. One of the voltage signals is inverted and the two voltage signals are then summed and averaged. This average signal is proportional to the exact voltage across the motor. The average of the summed signal is then compared to a reference signal for that particular motor, indicating the maximum voltage rating. When the average voltage across the motor exceeds the reference, a limit signal is generated. The limit signal is then utilized in a servo loop to limit the voltage or speed of the motor.

By obtaining a signal proportional to the voltage across the motor for comparison with a reference signal indicating motor rating, each motor in a system can be individually controlled to operate within the correct voltage range. In this manner, a plurality of different motors can be individually controlled even though operated from a common power supply.

DETAILED DESCRIPTION OF THE INVENTION

Figure 1:
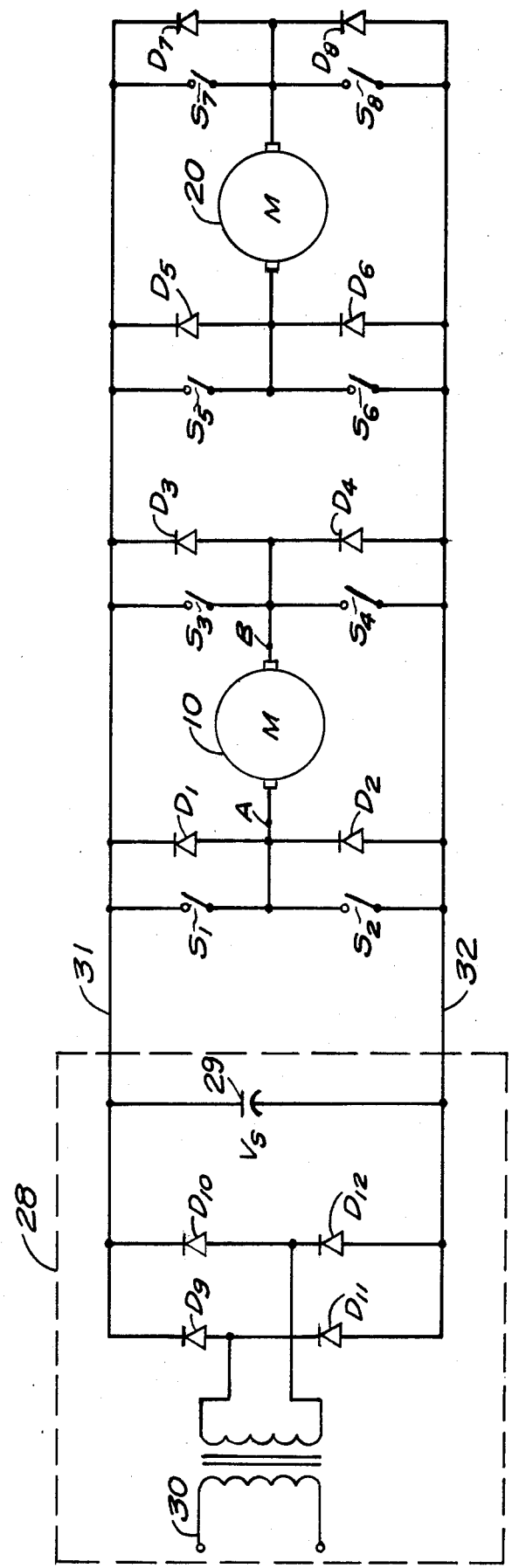
FIG. 1 is a schematic diagram of a plurality of different electric motors having different voltage ratings that are connected to a common power supply.

Referring now to FIG. 1, the schematic diagram illustrates electric motors 10,20 having different voltage ratings that are connected to a common power supply 28. Power supply 28 includes a transformer 30, a capacitor 29, and diodes D9–D12 which are connected in the form of a conventional diode bridge. The motor 20, for example, may be rated at a value of 200 volts, and the motor 10 may be rated at a value of 150 volts. The power suply 28, therefore, is rated at 200 volts in order to accommodate the larger motor 20.

The voltage from the power supply 28 is applied to the motor 10 by the switches S1–S4 and the diodes D1–D4. Likewise, voltage is applied to the motor 20 by the switches S5–S8 and the diodes D5–D8. The motor 10 and its associated switches S1–S4 and its diodes D1–D4 are configured in a conventional H-bridge configuration that is connected between positive bus 31 and the negative bus 32 from the power supply 28. Likewise, the motor 20 and its associated switches S5–S8 and its diodes D5–D8 are connected in parallel between the positive bus 31 and the negative bus 32. The present invention is described in connection with an H-type bridge, but any circuit capable of applying voltage to an electric motor is adaptable for use with the present invention.

Figure 2:
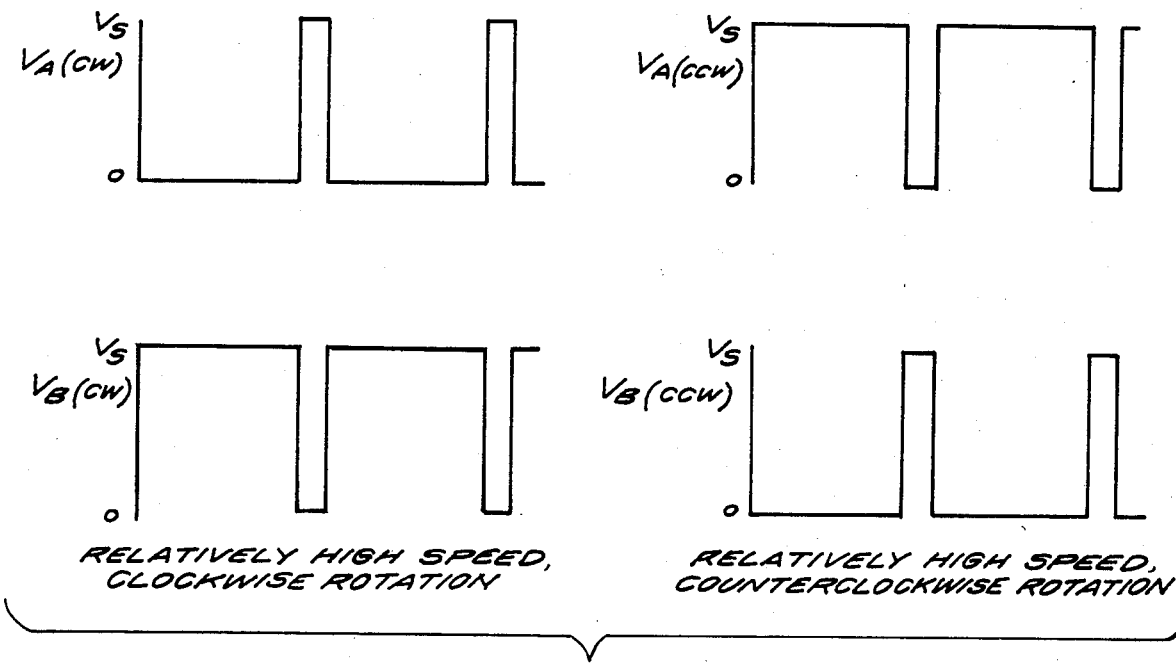
FIG. 2 illustrates a plurality of waveforms of the voltages appearing across one of the electric motors of FIG. 1.

Referring now to FIG. 2, waveforms illustrate the voltages generated across the motor 10 at points A and B. The waveform $V_{A(CW)}$ is the voltage at point A with respect to the negative bus 32 when the motor 10 is rotating in a clockwise direction at a relatively high speed. The waveform $V_{B(CW)}$ is the voltage at point B with respect to the negative bus 32 when the motor 10 is rotating in a clockwise direction at a relatively high speed. The waveforms $V_{A(CW)}$ and $V_{B(CW)}$ are 180° out of phase with of one another. The waveforms $V_{A(CW)}$ and $V_{B(CW)}$ are always the inverse of one another. As the velocity of the motor 10 increases, the duty cycle of the waveforms $V_{A(CW)}$ and $V_{B(CW)}$ increases, but nevertheless they maintain their out of phase relationship. The waveforms $V_{A(CCW)}$ and $V_{B(CCW)}$ depict the out of phase waveforms when the motor 10 is rotating in a counter-clockwise direction at a relatively high speed.

Figure 3:
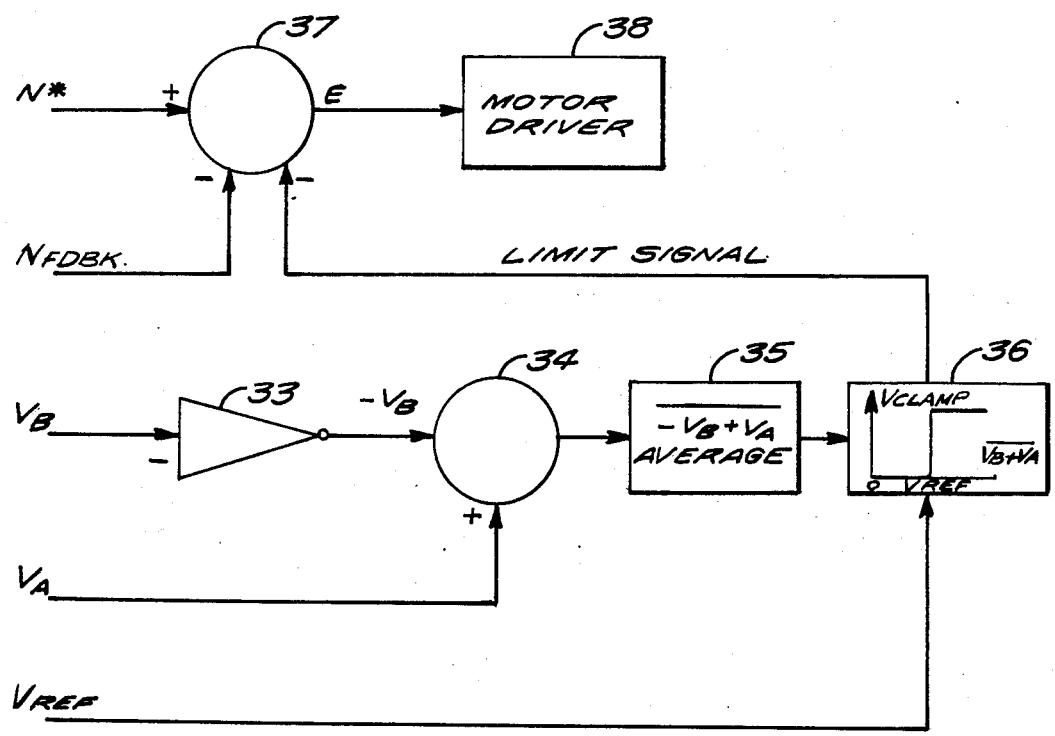
FIG. 3 is a block diagram of the motor control system and the voltage control circuit of the present invention.

Referring now to FIG. 3, a block diagram illustrates the voltage control circuit of the present invention. The voltages $V_A$ and $V_B$ are the voltages that are picked off on either side of the motor 10. The voltage $V_B$ is applied to an inverter 33 which inverts the waveform. The inverted waveform $-V_B$ is applied to a summing junction 34 where it is summed with the waveform $V_A$. The output of the summing junction 34 is applied to an averaging circuit 35 which provides a signal indicative of the average of the sum of the inverted voltage $-V_B$ plus the non-inverted voltage $V_A$. The average voltage signal is then applied to a comparator 36 which compares the average voltage to a reference voltage $V_{ref}$. When the average voltage $V_{av}$ exceeds the reference voltage $V_{ref}$, a limit signal is generated. The limit signal is applied to a summing junction 37 of a conventional speed control loop of a motor control system. The summing junction 37 also receives a speed command signal N* and a speed feedback signal $N_{fdbk}$. The output signal of the summing junction 37 is an error signal E which is applied to a motor driver 38. The motor driver 38 is used to apply the voltages from the power supply 28 to the motor 10. The motor driver 38 includes the switches S1-S4 and the diodes D1-D4 illustrated in FIG. 1. When the limit signal is applied to the summing junction 37, the limit signal causes the voltage supplied across the motor 10 to be limited to the value of the voltage $V_{ref}$ which is maximum voltage capacity of the motor 10, i.e., 150 volts.

Figure 4:
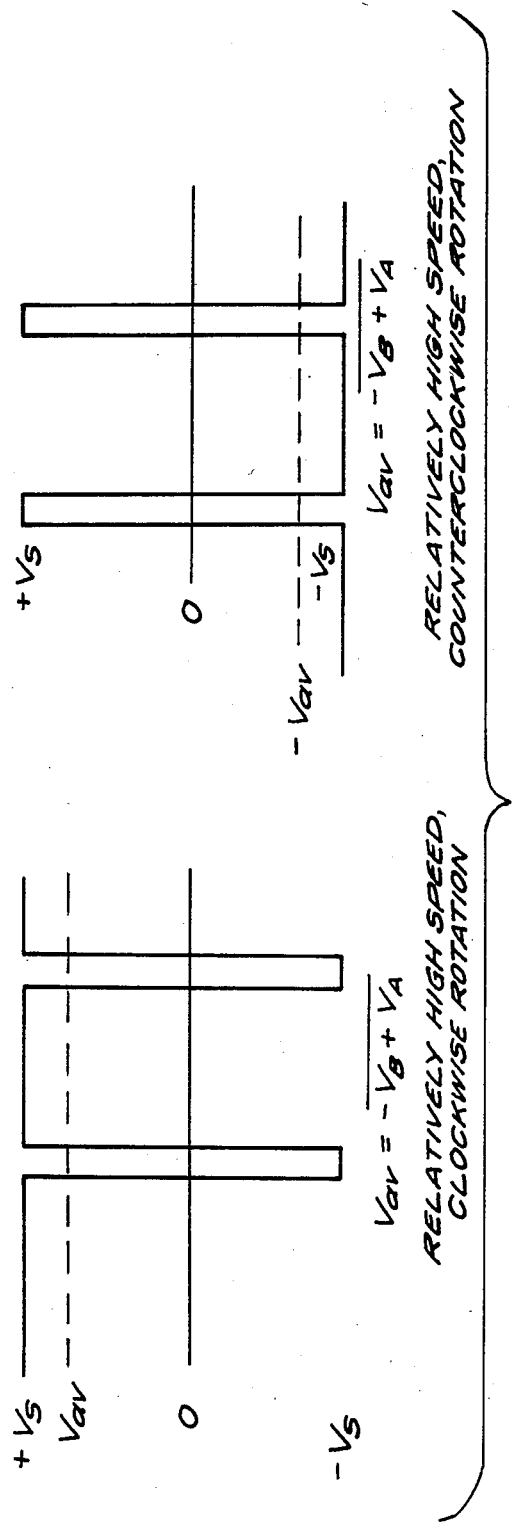
FIG. 4 illustrates various waveforms associated with the block diagram of FIG. 3.

Referring now to FIG. 4, representative examples of the output of the averaging circuit 35 are illustrated. The average voltage across the motor 10 is a relatively high value when the motor 10 is rotating in a clockwise direction at a relatively high speed. FIG. 4 depicts the relatively high average voltage $V_{AV}$ as a composite of the inverted voltage $V_{B(CW)}$ and the non-inverted voltage $V_{A(CW)}$ of FIG. 2., when the motor 10 is rotating relatively quickly in a clockwise direction. The relatively high voltage $-V_{av}$ is a composite of the inverted voltage $V_{B(CCW)}$ and the non-inverted voltage $V_{A(CCW)}$, when the motor 10 is rotating at a relatively high speed in a counterclockwise direction.

Figure 5:
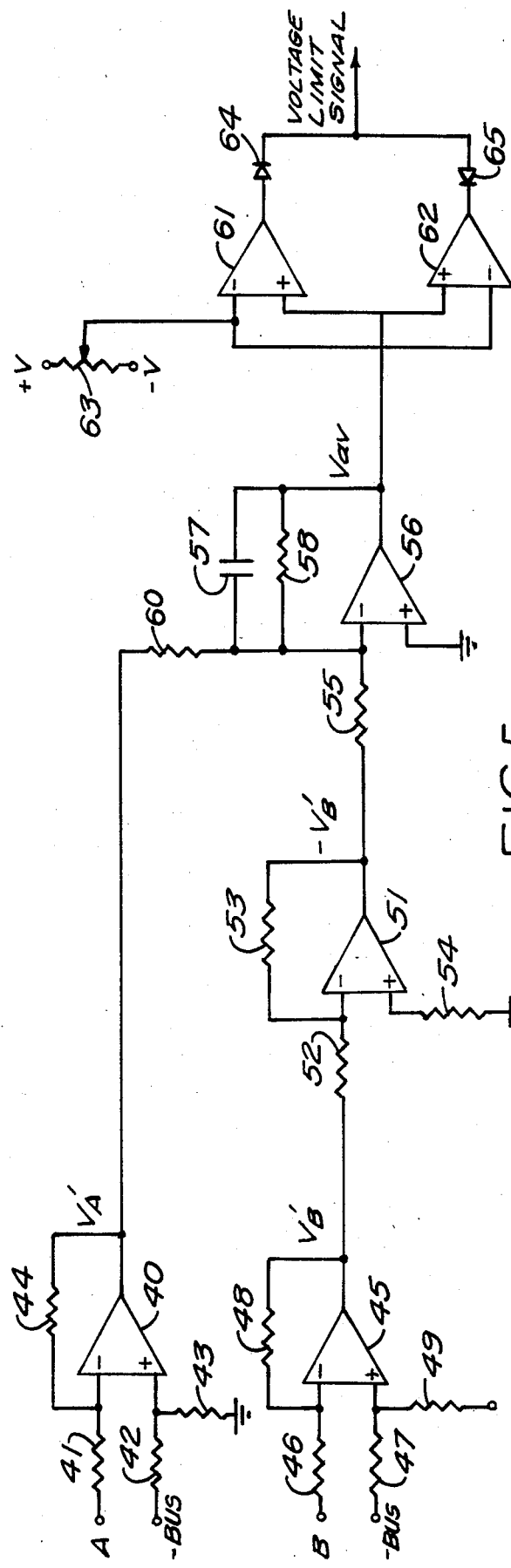
FIG. 5 is a schematic circuit diagram of the voltage control circuit.

FIG. 5 is a schematic diagram illustrating the voltage control circuit which generates the limit signal that limits the voltage across the motor 10. The voltage control circuit includes an operational amplifier 40 which is configured as a differential amplifier and which is connected to point A via a high impedance resistor 41 and which is connected to the negative bus by a second high impedance resistor 42. The high impedance resistors 41, 42 have a value on the order of 2.5 megohms. The operational amplifier 40 also has a resistor 43 connected between its non-inverting input terminal and ground, and a feedback resistor 44 connected between the output terminal and the inverting input terminal. The output of the operational amplifier 40 is the signal $V'_A$. The high impedance resistors 41, 42 effectively isolate the voltage control circuit from the rest of the motor control system.

The voltage control circuit also includes a second operational amplifier 45 which is configured as a differential amplifier and which is connected to the point B via a high impedance resistor 46 and is connected to the negative bus via a high impedance resistor 47. The operational amplifier 45 alos includes a feedback resistor 48 connected from its output to its inverting input terminal. A resistor 49 is connected between the non-inverting input terminal of the operational amplifier 45 and ground. The output of the operational amplifier 45 is the signal $V'_B$. The high impedance resistors 46, 47 also isolate the operational amplifier 45 from the rest of the motor control circuit.

The output signal $V'_B$ from the operational amplifier 45 is applied to an operational amplifier 51 via a resistor 52 which is connected to the inverting input terminal of the operational amplifier 51. The operational amplifier 51 includes a feedback resistor 53 connected from its output to its inverting input terminal and also has a resistor 54 connected between its non-inverting input terminal and ground. The operational amplifier 51 acts as an inverter and inverts the signal $V'_B$ such that it becomes $-V'_B$.

The output of the operational amplifier 51 is applied via resistor 55 to the inverting input terminal of the operational amplifier 56. The operational amplifier 56 has its non-inverting input terminal connected to the ground and includes a capacitor 57 and a resistor 58 connected in parallel from its output terminal to its inverting input terminal. The inverting input terminal of the operational amplifier 56 is connected to the output terminal of the operational amplifier 40 by a resistor 60. The operational amplifier sums signals $V'_A$ and $-V'_B$ to provide an average voltage signal $V_{av}$. The capacitor 57 performs an averaging function.

The output of the operational amplifier 56 is applied to a pair of comparators 61, 62. The non-inverting input terminal of comparator 61 and the non-inverting input terminal of comparator 62 are connected to a voltage reference potentiometer 63. The potentiometer 63 is connected between a positive voltage source and a negative voltage source and is adjusted to provide a reference signal $V_{ref}$. The comparators 61, 62 compare the average voltage signal $V_{av}$ to the voltage reference signal $V_{ref}$. When the output of the operational amplifier 61 is negative, the diode 64 blocks the output of comparator 61. When the output of the comparator 61 is positive the diodes 64 passes the output of the comparator 61 as a voltage limit signal. Likewise, the diode 65 blocks the output of comparator 62 when it is positive and passes the output when it is negative. The output of the comparators 61, 62 that passes through the diodes 64, 65 is the voltage limit signal.

In operation, the voltage limit signal is used to limit the voltage applied across the motor 10 of FIG. 1. In FIG. 1 the power supply 28 is rated for the maximum voltage rating of the two motors 10, 20. Since the motor 10 is rated at a 150 volts, and motor 20 is rated at 200 volts, the power supply 28 must be capable of providing 200 volts. If the full voltage of power supply 28 is applied to the motor 10, the power supply 28 will cause damage to the motor 10. The apparatus of the present invention provides a voltage limit signal that prevents the full voltage of the power supply 28 from being applied across motor 10.

The H-type switching bridge operates in a generally conventional fashion as long as the voltage applied across the motor 10 does not exceed 150 volts. When the voltage control circuit senses that voltage across the motor is equal to 150 volts, the voltage limit signal is generated and applied to the summing junction 37 of the speed control loop of FIG. 3. The speed command signal N* applied to the summing junction 37 is proportional to the speed at which it is desired to drive the motor 10. When the feedback signal $N_{fdbk}$ exceeds the speed command signal N*, the motor driver 38 decreases the voltage across the motor 10 and motor 10 slows down. Likewise, when the voltage limit signal is applied to the summing junction 37, the motor driver 38 responds by decreasing the voltage across the motor 10, since the limit signal is set at a value higher than that of the maximum speed command signal N*. In this way the voltage applied to the motor 10 is safely limited.

While the invention has been described in its preferred embodiments, it is to be understood that the words which have been used are words of description rather than limitation, and that changes may be made within the purview of the appended claims without departing from the true scope and spirit of the invention in its broader aspects.

I claim:

1. A voltage control circuit for an electric motor for use in a system having a plurality of motors having different voltage ratings that are connected between a positive and a negative buses of a common power supply, which comprises an H-bridge switching array for controlling bidirectional current flow through the motor;

means for determining an average voltage across the motor by summing a voltage on one side of the motor with an inverted voltage on the other side of the motor;

means for comparing a signal indicative of the average voltage to a reference voltage and providing a voltage limit signal, when the signal indicative of the average voltage exceeds the reference voltage; and utilization means, responsive to the voltage limit signal of said comparing means, for preventing higher voltages from being applied across the motor.

2. A voltage control circuit according to claim 1 wherein said means for determining an average voltage across the motor includes a plurality of high impedance resistors and an operational amplifier coupled between a motor input terminal and the negative bus of the power supply, and a plurality of high impedance resistors and an operational amplifier coupled between a motor output terminal and the negative bus of the power supply.

3. A voltage control circuit according to claim 2 wherein said comparing means includes a pair of comparators.

4. A voltage control circuit for an electric motor for use in a system having a plurality of motors having different voltage ratings that are connected between buses of a common power supply, which comprises average voltage determining means for determining an average voltage across the motor;

means for comparing a signal indicative of the average voltage to a reference voltage and providing a voltage limit signal, when the signal indicative of the average voltage exceeds the reference voltage; and utilization means, responsive to the voltage limit signal of said comparing means, for preventing higher voltages from being applied across the motor; and wherein said average voltage determining means includes a voltage determining means for determining a first voltage on one side of the motor and a second voltage on the other side of the motor; means for inverting said first voltage for providing an inverted voltage and means for summing said second voltage and said inverted voltage such that a signal indicative of average voltage across the motor is obtained.

5. A voltage control circuit according to claim 4 wherein said means for inverting includes an inverter.

* * * * *